United States Patent [19]
Portoulas

[11] 3,810,003
[45] May 7, 1974

[54] DEVICE FOR DETERMINING IMPROPER REVERSAL AND/OR SHORT OF GROUND AND NEUTRAL LINES AND AMOUNT OF IMPEDANCE IN GROUND LINE OF A THREE-WIRE A.C. OUTLET

[75] Inventor: Peter G. Portoulas, Chicago, Ill.

[73] Assignee: Ecos Corporation, Chicago, Ill.

[22] Filed: July 6, 1971

[21] Appl. No.: 159,806

[52] U.S. Cl. .................................... 324/51, 324/66
[51] Int. Cl. ...................... G01r 27/18, G01r 31/02
[58] Field of Search ........ 324/51, 66, 133; 340/255; 317/18 B, 18 D

[56] References Cited
UNITED STATES PATENTS

| | | | |
|---|---|---|---|
| 3,176,219 | 3/1965 | Behr | 324/51 |
| 3,263,164 | 7/1966 | Solgere | 324/51 |
| 3,281,677 | 10/1966 | Baggott | 324/51 X |
| 3,368,146 | 2/1968 | Regan et al. | 324/51 |
| 3,066,284 | 11/1962 | McKinley et al. | 340/255 |
| 3,579,100 | 5/1971 | Lauver | 324/53 |
| 3,317,825 | 5/1967 | Huff | 324/51 |
| 3,383,588 | 5/1968 | Stoll et al. | 324/51 |
| 2,956,229 | 10/1960 | Henel | 324/133 |
| 2,428,563 | 10/1947 | Fountain | 340/255 |

FOREIGN PATENTS OR APPLICATIONS

| | | | |
|---|---|---|---|
| 628,667 | 9/1949 | Great Britain | 324/51 |
| 807,544 | 1/1959 | Great Britain | 324/51 |
| 958,718 | 5/1964 | Great Britain | 324/51 |

*Primary Examiner*—Gerard R. Strecker
*Attorney, Agent, or Firm*—Merriam, Marshall, Shapiro & Klose

[57] ABSTRACT

A three wire ground type AC outlet tester for testing (1) the correctness of socket wiring of three-wire receptacles, including neutral-ground reversal or shorting errors, (2) the magnitude of electrical impedance in the ground circuit, and (3) the existence of undesirable excess voltages, the tester including signal injecting means for injecting a test pulse into the ground-neutral circuit, a threshold detector responsive to a sensed magnitude value for responding to the amount of impedance in the ground circuit, and indicating means energized for indicating the presence of an amount of impedance in the ground neutral line which exceeds pre-set threshold impedance levels. The tester includes means for positively indicating an improper reversal or shorting of ground and neutral connections at the terminals of a test outlet and further includes means for providing a distinct indication of either an open ground or open neutral wiring error.

7 Claims, 3 Drawing Figures

INVENTOR
PETER G. PORTOULAS

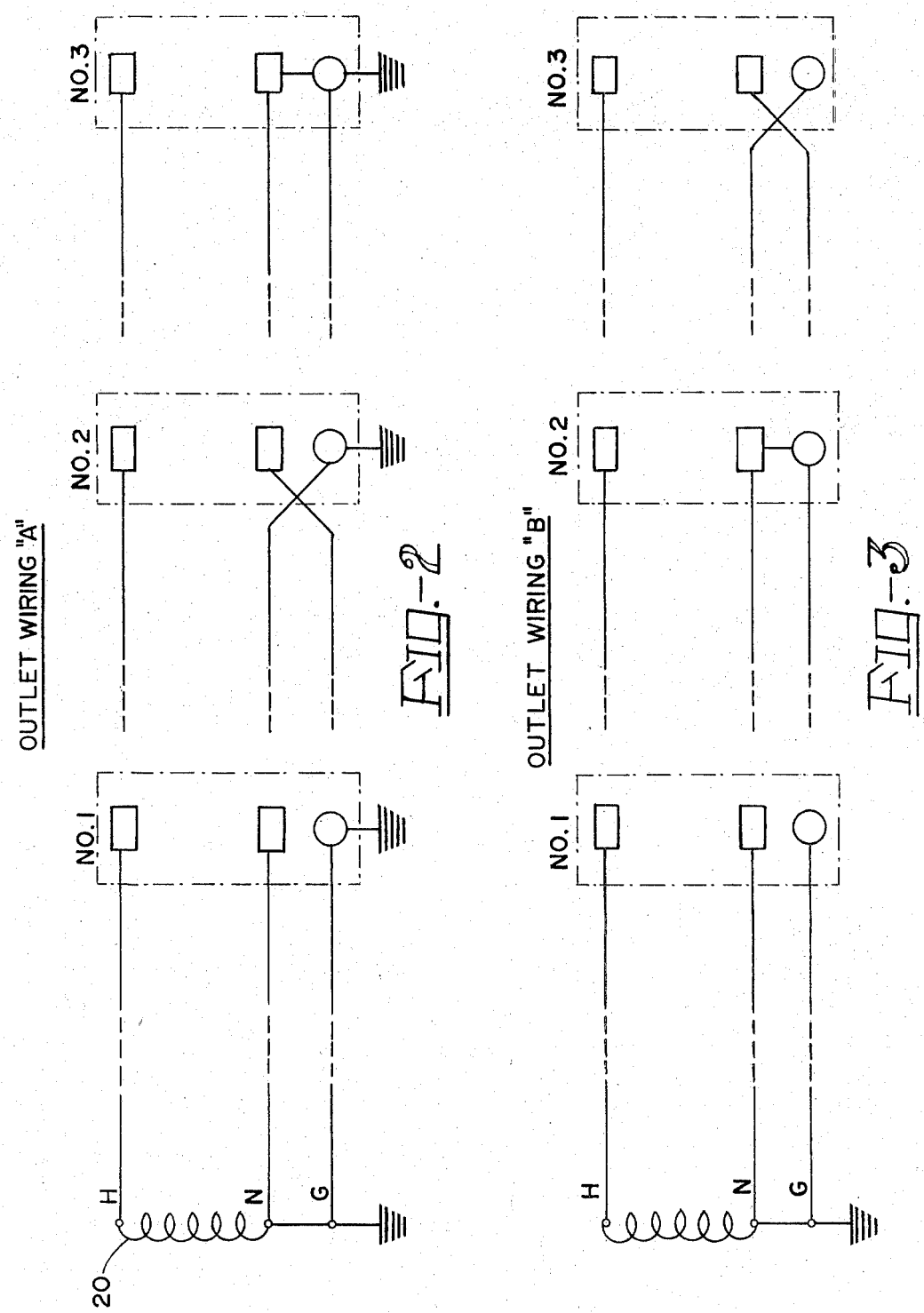

DEVICE FOR DETERMINING IMPROPER REVERSAL AND/OR SHORT OF GROUND AND NEUTRAL LINES AND AMOUNT OF IMPEDANCE IN GROUND LINE OF A THREE-WIRE A.C. OUTLET

This invention relates to electrical testing apparatus and more particularly to apparatus for testing AC outlets.

Present day building construction utilizes three-wire AC outlets or receptacles for supplying a standard 120 volt alternating current. Such standard outlets contain three-wire sockets--one wire to be connected to the hot side of the incoming electrical supply line, a second wire to be connected to the neutral supply line, and the third to be connected to earth ground. It is, of course, necessary to insure that all of the above connections have been properly made at each outlet in order to prevent damage to equipment and possible injury to personnel.

Various arrangements have been proposed for testing the correctness of wiring at three-wire ground-type electrical receptacles, as shown for example in U.S. Pat. Nos. 3,317,825 and 3,383,588. However, none of such known devices can detect a wiring error in which the ground and neutral connections are reversed and-/or shorted. Furthermore, all such devices do not present a positive and easily discernible indication when the neutral or ground wire is open.

Another desirable test for new wiring is one to insure that the electrical ground system (or circuit) has a low impedance, and can thereby effectively prevent electrical shocks should a fault occur. The grounding circuit is normally supplied by a metallic electrical conduit connected to a suitable earth ground, such as a water pipe. If the conduit connections and the earth ground are electrically good, a proper low impedance ground is furnished to the receptacle ground socket. However, if these conditions are not met, then a high impedance will be presented at the ground socket and the desired safety feature of the three-wire receptacle will not be present.

SUMMARY OF THE INVENTION

In accordance with the principles of this invention, there is provided a compact, single unit AC outlet tester by which one is able to readily test: (1) the correctness of socket wiring of three-wire receptacles, including neutral-ground reversal and/or shorting errors; (2) the magnitude of electrical impedance in the ground circuit and particularly whether a predetermined value of impedance is exceeded; and (3) the existence of undesirable excess voltages.

THE DRAWING

FIG. 2 is a schematic diagram illustrating correct, reversed, and shorted ground-neutral terminal connections at three outlets in one type of three-wire grounded system (System A); and FIG. 3 is a schematic diagram illustrating various possible ground-neutral terminal connections at several outlets in another type of three-wire grounded system (System B).

DESCRIPTION

Figure 1:
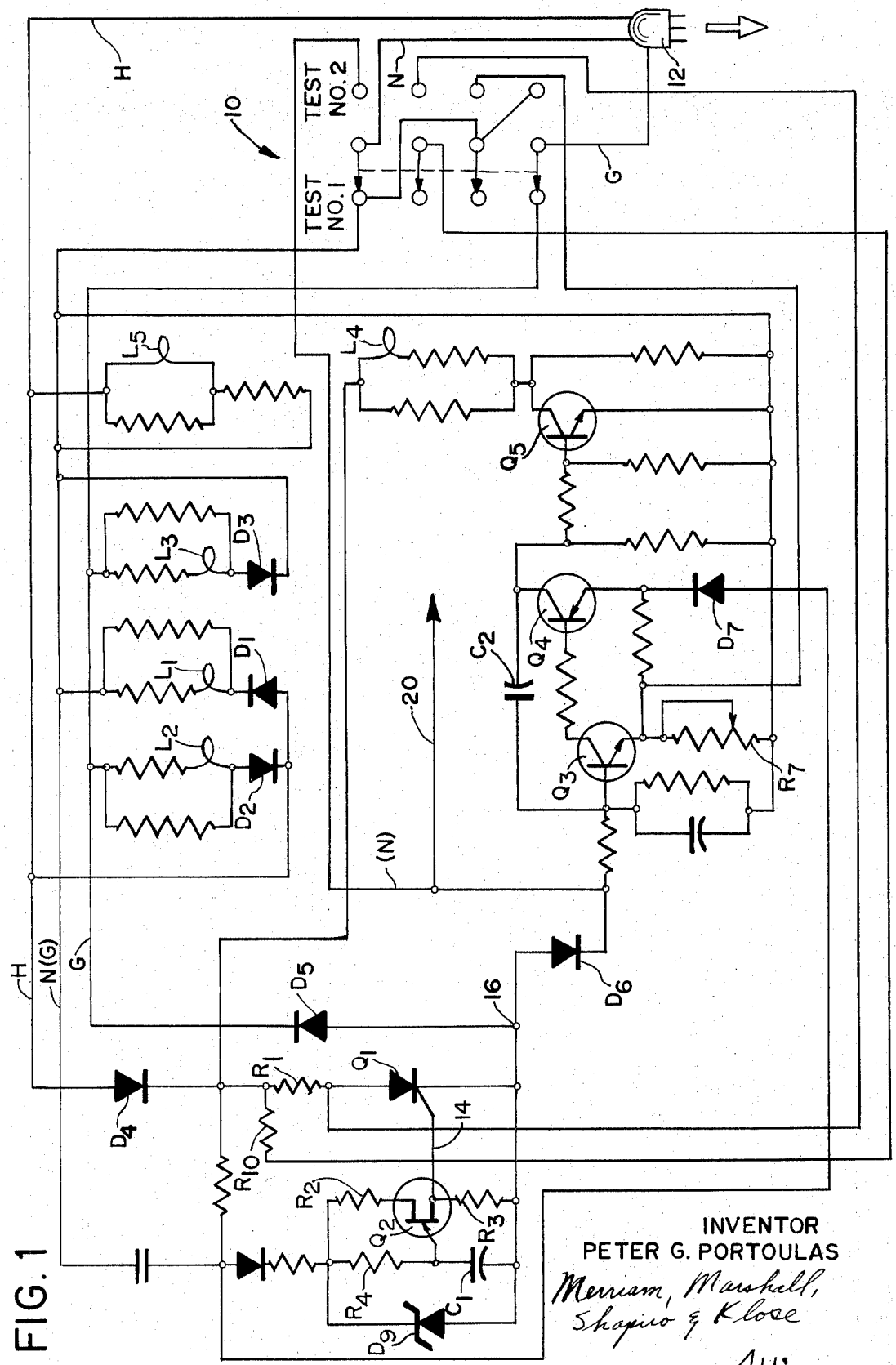
FIG. 1 is a schematic diagram illustrating an AC outlet tester constructed in accordance with the principles of the present invention.

Referring now to FIG. 1, there are schematically illustrated the various components and the interconnections of an AC outlet tester for 120 volt AC three-wire receptacles. Basically, the illustrated unit performs two primary tests which are selected by the test function switch 10 for selecting either Test 1 or Test 2, as will hereinafter be described in more detail. Test 1, which is performed first, determines the correctness of the wiring with the exception of neutral-ground reversal and/or shorting errors. After any faults indicated by Test 1 have been corrected, Test 2 is then conducted to determine whether the neutral and ground connections are proper. A specific description of these individual tests and the components associated therewith as shown in FIG. 1 will now be described.

TEST 1

A polarized three-prong outlet plug 12 is provided for connection to the individual hot ($H$), neutral ($N$), and ground ($G$) of a three-wire receptacle which is to be tested. With the test function switch 10 in the Test 1 position as shown in FIG. 1, lamp $L_1$ has one end thereof coupled through a suitable resistor to the neutral line, and another end connected through diode $D_1$ to the hot line. Lamp $L_2$ is coupled to the ground line at one side and through diode $D_2$ to the hot line on the other side. Lamp $L_3$ is coupled on one side to the ground line and through diode $D_3$ to the neutral line.

For convenience in understanding the following description, immediately above and slightly to one side of the lamp and diode combination, the hot line is labeled $H$, the neutral line is labeled $N$ and the ground line is labeled $G$. This is the condition of such lines in Test 1. As will be described in connection with Test 2, when function switch 10 is set to Test 2 position, the neutral line within the unit is connected to ground. For convenience in later discussing the Test 2 conditions, the Test 2 line conditions have been indicated in parentheses in FIG. 1.

With lamps $L_1$, $L_2$ and $L_3$ connected across the three lines as described, the illustrated unit is capable of detecting seven possible wiring conditions as follows:

|  | $L_1$ | $L_2$ | $L_3$ |
|---|---|---|---|
| a. Correct Wiring | X | X | O |
| b. Reversed Polarity | X | O | X |
| c. Open Ground | X | O | O |
| d. Open Neutral | O | X | O |
| e. Open Hot | O | O | O |
| f. Hot & Ground Reversed | O | X | X |
| g. Hot on Neutral & Hot Terminal Unwired | O | O | X |

X Lamp On
O Lamp Off

In the event the receptacle is wired other than correctly, the specific nature of the error is immediately apparent and can be rectified.

The Diodes $D_1$, $D_2$ and $D_3$ are used to prevent a potentially misleading indication which might arise. Consider the case where neon lamps of threshold 60 volts AC or less are used without diodes. If the ground wire was open, current would flow from hot to neutral through lamps $L_2$ and $L_3$ to cause them to light. If incandescent lamps were used, under this condition the respective $L_2$ and $L_3$ lamps would light, but dimly. In either instance, this would be a false indication. Diodes $D_2$ and $D_3$ prevent this result. For the case of open ground, diodes $D_2$ and $D_3$ are connected back to back (anode to anode), preventing any current from flowing through lamps $L_2$ and $L_3$. A similar situation is provided for the case of an open neutral line with respect to diodes $D_1$ and $D_3$. The diodes thus provide distinct lamp "on" or lamp "off" conditions, which can be very easily discerned by the operator in the case of either an open ground or an open neutral.

$L_5$ has one end connected to the hot side and another end connected to the neutral line and is used to detect the presence of voltages in excess of 140 volts AC. In this instance, lamp $L_5$ is a neon lamp having a threshold voltage in excess of 140 volts.

With the function switch 10 in the Test 1 position, the illustrated unit is also capable of determining whether the impedance in the ground circuit exceeds a predetermined value. Lamp $L_4$ is utilized for this purpose in the following manner.

The determination of ground impedance is accomplished by inserting a current pulse or a series of pulses into the ground of the AC outlet under test. An oscillator is used to generate a pulse at a uniform rate, on the order of every two seconds. This pulse triggers a current generator which places a current pulse of approximately 10 milliseconds duration in the ground circuit. A threshold type of monostable multivibrator amplifier (mono) detects the potential developed between ground and neutral, and when a sufficiently large potential difference is sensed, the mono is turned on for approximately 1 second for every pulse of the current generator. The output of the mono drives a lamp amplifier that causes lamp $L_4$ to turn on for the same period of time. The entire process is repeated continuously by the oscillator causing the lamp to flash if the impedance exceeds the desired value.

Referring now to FIG. 1, the detailed circuit components and interconnections thereof for accomplishing the aforementioned impedance test is illustrated. The pulse oscillator which pulses every 2 seconds is provided by a unijunction transistor $Q_2$ circuit which through output lead 14 is connected to the gate electrode of a silicon controlled rectifier (SCR) $Q_1$. The anode end of SCR $Q_1$ is coupled to the hot line and the cathode end is coupled through diode $D_5$ to the ground line. Thus, current pulses are injected into the ground circuit via diode $D_4$, $R_1$, $Q_1$, and diode $D_5$.

The pulse rate is determined by a time constant in the unijunction $Q_2$ circuit, namely, the time constant $R_4 C_1$. Zener diode $D_9$ connected across $R_4 C_1$ maintains a constant DC voltage to the unijunction $Q_2$. As a result of the current pulses, a voltage is developed at the junction 16 between the anode end of diode $D_5$ and the anode end of diode $D_6$. The magnitude of the voltage developed at junction 16 corresponds to the amount of impedance in the conduit, or in other words in the ground-neutral circuit. Diodes $D_5$ and $D_6$ isolate the electronic components from possible damage in the event the hot and ground connections in the outlet under test are incorrectly wired in reverse.

The cathode end of diode $D_6$ is connected to the input transistor stage $Q_3$ of a monostable multivibrator. The input stage also includes a potentiometer $R_7$ connected to the emitter. $R_7$ adjusts the amount of reverse bias on transistor $Q_3$ so as to determine the amount of impedance in the ground circuit that will cause a potential at junction 16 large enough to turn $Q_3$ on. $R_7$ therefore sets a threshold level for input stage $Q_3$, which acts as a threshold detector.

If the magnitude of the voltage developed at junction 16 is of sufficient amplitude (indicating the ground impedance is higher than desired), the input stage of the monostable multivibrator will be turned on, driving transistor $Q_4$ into saturation. It may be noted that the capacitor $C_2$ feeds back a portion of the signal to the input stage in order to maintain $Q_4$ in saturation for a period of time determined by $C_2$ and the equivalent base resistance of $Q_3$. The output of $Q_4$ drives $Q_5$ on and causes $L_4$ to flash.

TEST 2

After all the faults detected during Test 1 in the outlets under test have been corrected, Test 2 is then conducted in order to determine whether the neutral and ground connections at the outlets are improperly reversed and/or shorted. Test 2 can be conducted in either outlet wiring system A shown in FIG. 2 or outlet wiring system B shown in FIG. 3, as is outlined separately below.

Initially, the test function switch 10 is operated to the Test 2 position to short out potentiometer $R_7$ (thus increasing the gain of $Q_3$), and to place $R_{10}$ in parallel with $R_1$ (thus increasing the pulse output current).

In outlet wiring system A, the ground terminal of each outlet is connected to earth ground, as shown in the diagrams of FIG. 2. Outlet No. 1 is correctly wired to the power transformer 20; outlet No. 2 has its neutral and ground reversed; and outlet No. 3 has its neutral and ground shorted. In testing the neutral-ground wiring of such outlets with the AC outlet tester of this invention, the ground/neutral probe 20 is not used.

The switch is placed in Test 2 and the tester is connected to the outlet under test. The following conditions will be observed:

a. N-G correct, outlet No. 1 - Lamp $L_4$ will be flashing;

b. N-G reversed, outlet No. 2 - Lamp $L_4$ will not flash, since a short is placed from base to emitter of $Q_3$;

c. N-G shorted, outlet No. 3 - same as (b).

It must be noted that for short electrical distances between the correctly wired outlet No. 1 and the incorrectly wired outlets No. 2 or No. 3 when test No. 2 is performed for outlet No. 1, the lamp may not flash. In such a case the test will indicate that there is a ground-neutral reversal or a ground-neutral short in the system.

In outlet wiring system B as is shown in FIG. 3, outlet No. 1 is inspected for correctly wired ground and neutral. The tester is connected through its 3 wire outlet plug 12 to outlet No. 1, with switch 10 in the Test 2 position.

a. If the electrical distance between outlet No. 1 and No. 2 is short, the lamp $L_4$ will not flash. This will indicate a neutral-ground short in the system.

b. If the electrical distance between outlet No. 1 and No. 2 is high enough, the lamp will flash. The test will then be continued using the ground-neutral probe 20. By connecting the test probe 20 to the ground terminal of No. 2, the lamp $L_4$ will stop flashing indicating, for the time being, correct N & G. However, when it is used as a reference for testing the next outlet, at the moment that the unit is connected to it through plug 12, the lamp $L_4$ will not flash indicating a ground-neutral short.

c. Outlet No. 2 is corrected and used as reference for No. 3. Testing of outlet No. 3 is conducted by first inserting plug 12 into a reference outlet (such as outlet No. 1 or corrected outlet No. 2) and then inserting the probe 20 into the ground terminal at outlet No. 3 under test. Since the ground wire of outlet No. 3 is improperly connected to the neutral terminal, $L_4$ will continue to flash serving as a positive indication that the neutral and ground wires are reversed. Notice that if the ground wire is an outlet under test is correctly connected, the cathode of $D_6$ will be shorted to ground and $L_4$ will cease to flash.

The foregoing detailed description has been given for clearness of understanding only, and no unnecessary limitations should be understood therefrom, as modifications will be obvious to those skilled in the art.

What is claimed is:

1. An AC outlet tester for determining the amount of impedance in the ground line of a three-wire AC outlet provided with three terminals connected respectively to an energized hot line, a neutral line, and a ground line, said tester comprising:

circuit means for connecting between said hot line terminal and said ground line terminal, said circuit means including resistance means in series with a pulsed current generator means for causing the introduction of a current pulse from said hot line into said ground line;

threshold detector means for connection between said neutral line terminal and said ground line terminal for sensing the potential developed in said ground line by the passage therethrough of said current pulse, the magnitude of said sensed potential corresponding to the amount of impedance in said ground line;

said threshold detector including means for setting in said detector a threshold potential level corresponding to a predetermined amount of impedance in said ground line;

said detector further including means for providing an output signal when the potential developed in said ground line exceeds said threshold level; and indicating means energized by said output signal for indicating the presence of impedance in said ground line which exceeds said predetermined amount.

2. An AC outlet tester as claimed in claim 1, wherein said threshold detector comprises a monostable amplifier including, a triggered input stage having adjustable means for adjusting said threshold level at which said input stage is triggered, and a second stage providing said output signal when said first stage is triggered, said multivibrator further including means for terminating said output signal after a predetermined time period.

3. An AC outlet tester as claimed in claim 2, wherein said outlet signal is repeated for each pulse in said test signal if the amount of impedance in said ground-neutral circuit exceeds said predetermined amount of impedance, thereby causing said indicating means to be repetitively energized.

4. An AC outlet tester for indicating an improper reversal and/or short of ground and neutral connections and for determining the amount of impedance in the ground line in a three-wire AC outlet provided with three terminals connected respectively to an energized hot line, a neutral line, and a ground line, said tester comprising:

circuit means for connection between said hot line terminal and one of said neutral and said ground line terminals, said circuit means including resistance means in series with a pulsed current generator means for causing the introduction of repetitive current pulses from said hot line into said neutral line or said ground line;

threshold detector means for connection between said neutral line terminal and said ground line terminal for sensing the potential developed in said neutral line or said ground line by the passage therethrough of said current pulses, the magnitude of said potential corresponding to the amount of impedance in said neutral line or said ground line;

said threshold detector including switch-actuated means for setting in said detector either a first threshold potential level corresponding to a predetermined amount of impedance in said ground line or a second threshold level corresponding to the minimum impedance in the neutral line of a properly wired outlet;

said detector further including means for providing an output signal when said sensed potential exceeds the threshold level set in said detector; and indicating means energized by said output signal indicating the presence of impedance above said threshold level, whereby said indicating means will be energized if the ground impedance exceeds said predetermined value and will not be energized if said ground and neutral connection at said test outlet are reversed and/or shorted.

5. An AC outlet tester as claimed in claim 4 including a test cable having one end coupled to the connection of said threshold detector to a known neutral line and another end adapted to be connected to the expected ground terminal of a test outlet, whereby said indicating means will not be energized if the ground and neutral connections at said test outlet are proper, when said test cable is connected to said ground terminal of said test outlet.

6. A three-wire ground type AC outlet tester for determining an improper reversal and/or short of ground and neutral connections at the terminals of an outlet, said terminals being connected respectively to an energized hot line, a neutral line and a ground line, said tester comprising:

circuit means for connection between said hot line terminal and said neutral line terminal, said circuit means including resistance means in series with a current generator means for causing the introduction of a current pulse from said hot line into said neutral line;

threshold detector means for connection between said neutral line terminal and said ground line terminal for sensing the potential developed in said neutral line by the passage therethrough of said current pulses, the magnitude of said potential corresponding to the amount of impedance in said neutral line;

said threshold detector including means for setting in said detector a threshold potential corresponding to the minimum impedance in the neutral line of a properly wired outlet;

said detector further including means for providing an output signal when said sensed potential exceeds said threshold level; and indicating means energized by said output signal indicating the presence of impedance in said neutral line above said threshold level.

7. A three-wire ground type AC outlet tester as claimed in claim 6 wherein said circuit means is adapted for connection between the hot line terminal and the neutral line terminal of a known correctly wired outlet; and said tester further including:

a test probe having one end connected to the point of connection of said threshold detector means to said neutral line terminal and a second end adapted for connection to the expected ground terminal of a test outlet coupled to said correctly wired outlet;

whereby when said test probe is connected to the ground terminal of said test outlet, said indicating means will fail to be energized, thus indicating that the ground-neutral connections at said test outlet are properly connected.

* * * * *

UNITED STATES PATENT AND TRADEMARK OFFICE
CERTIFICATE OF CORRECTION

PATENT NO. : 3,810,003
DATED : May 7, 1974
INVENTOR(S) : Peter G. Portoulas

It is certified that error appears in the above—identified patent and that said Letters Patent are hereby corrected as shown below:

Col. 5, claim 3, line 63, "outlet"

should be --output--.

Signed and Sealed this

Eighteenth Day of April 1978

[SEAL]

Attest:

RUTH C. MASON
Attesting Officer

LUTRELLE F. PARKER
Acting Commissioner of Patents and Trademarks